United States Patent [19]

Valstyn et al.

[11] Patent Number: 5,255,141
[45] Date of Patent: Oct. 19, 1993

[54] READ-WRITE MAGNETIC HEAD WITH FLUX SENSING READ ELEMENT

[75] Inventors: Erich P. Valstyn, Los Gatos; Daniel A. Nepela, San Jose, both of Calif.

[73] Assignee: Read-Rite Corp., Milpitas, Calif.

[21] Appl. No.: 807,194

[22] Filed: Dec. 16, 1991

[51] Int. Cl.$^5$ .................... G11B 5/147; G11B 5/127
[52] U.S. Cl. .................................. 360/126; 360/113; 360/125
[58] Field of Search ............... 360/126, 125, 113, 114

[56] References Cited

U.S. PATENT DOCUMENTS

| | | | |
|---|---|---|---|
| 4,843,507 | 6/1989 | Schewe et al. | 360/125 |
| 5,095,397 | 3/1992 | Nagata et al. | 360/113 |
| 5,097,371 | 3/1992 | Somers | 360/113 |
| 5,111,352 | 5/1992 | Das et al. | 360/126 X |

Primary Examiner—John H. Wolff
Attorney, Agent, or Firm—Nathan N. Kallman

[57] ABSTRACT

A thin film read-write magnetic head includes a write inductive section having a magnetic circuit consisting of thin film magnetic layers and a read flux sensing element, such as a magnetoresistive device or Hall effect device, located in a gap in the magnetic circuit. During the write mode, a magnetic valve including an electrical conductor provides a shunt path to bypass the flux sensing element. During the read mode, a saturation current is directed to the valve conductor so that the shunt path is open, thereby allowing the flux sensing element to sense the readout signal.

7 Claims, 2 Drawing Sheets

READ-WRITE MAGNETIC HEAD WITH FLUX SENSING READ ELEMENT

FIELD OF THE INVENTION

This invention relates to a read-write magnetic head and in particular to a thin film magnetic head incorporating a flux sensing read element.

DESCRIPTION OF THE PRIOR ART

Thin film magnetic heads or transducers typically employ inductive elements for recording and reading data. As is well known, thin film magnetic heads comprise Permalloy layers that provide a transducing gap at which varying flux signals result in data being recorded on a magnetic disk during the write mode. During the read mode, magnetic flux representative of the recorded signals is sensed at the transducing gap to produce electrical signals which are read out for further utilization.

In the past, magnetoresistive (MR) and Hall effect devices have been used as flux sensing elements to implement the readout function. In a conventional MR head, the MR element and a biasing element, which is either a conductor or a magnetic layer, are positioned in a gap formed between two shield elements. An insulating layer that separates the MR element from the shields must be thick enough to ensure that there are no pin holes that would cause electrical contact between the shield elements and the MR element. If a dual element MR transducer is used, then three insulating layers and two magnetic layers must be placed into the gap between the two shields. In such case, the gap length is relatively large which adversely affects the resolution of the read process, particularly in high density data recording.

Another major problem associated with a conventional MR transducer is the undesirable generation of thermal noise spikes that occur when the magnetic head makes contact with asperities which protrude from the surface of the magnetic recording medium, such as a magnetic disk.

Also, in a conventional MR read head, the lateral region of sensitivity (which is the read width) is determined by the length of the MR transducer. This transducer length must be approximately equal to the track width. For small track widths, Barkhausen noise is relatively high as compared to signal amplitude, because the domain walls that cause such noise are located predominantly at the ends of the MR transducer.

Furthermore, in a conventional recording head having an MR read transducer, the write and read sections of the head must be carefully aligned with each other so that track following and track accessing for writing and reading at high track densities can be properly accomplished. In addition, a conventional MR read transducer combined with an inductive write head poses accessing problems when used with a rotary actuator due to the separation between the write gap and the MR flux sensing element.

Another problem that is recognized with a conventional MR read transducer is the generation of a voltage pulse which has a similar shape to that generated by an inductive read head, i.e., the voltage is at a maximum when the magnetization transition is at the center of the sensing gap. In order to detect this point in time with sufficient accuracy, the pulse is differentiated and the zero crossover of the differentiated voltage is detected. This required differentiation causes a substantial decrease in signal-to-noise ratio.

SUMMARY OF THE INVENTION

An object of this invention is to provide a read-write thin film magnetic head incorporating a flux sensing read element, wherein thermal noise spikes are virtually eliminated.

Another object of this invention is to provide a magnetic head with a flux sensing read element, wherein Barkhausen noise is effectively minimized.

Another object of this invention is to provide a magnetic head with a flux sensing read element which precludes the need for differentiation and provides an improved signal-to-noise ratio.

A further object is to provide a magnetic head having a flux sensing read element in which the alignment of the MR read and inductive write elements is not necessary so that certain manufacturing tolerance problems are eliminated.

According to this invention, a read-write thin film magnetic head comprises an inductive write section, a flux sensing MR read element and a valve conductor disposed in a shunt path coupled to the primary magnetic circuit of the head. During the write mode, the valve conductor is not energized and the flux sensing element is shunted, so that the magnetic flux bypasses the MR element and the head functions like a conventional thin film head. In the read mode, current is passed through the valve conductor to saturate the magnetic material surrounding the valve conductor. As a result, flux entering one of the pole tips of the head is sensed by the MR element whereby data signals are read out.

BRIEF DESCRIPTION OF THE DRAWING

The invention will be described in greater detail with reference to the drawing in which.

DETAILED DESCRIPTION OF THE INVENTION

Figure 1:
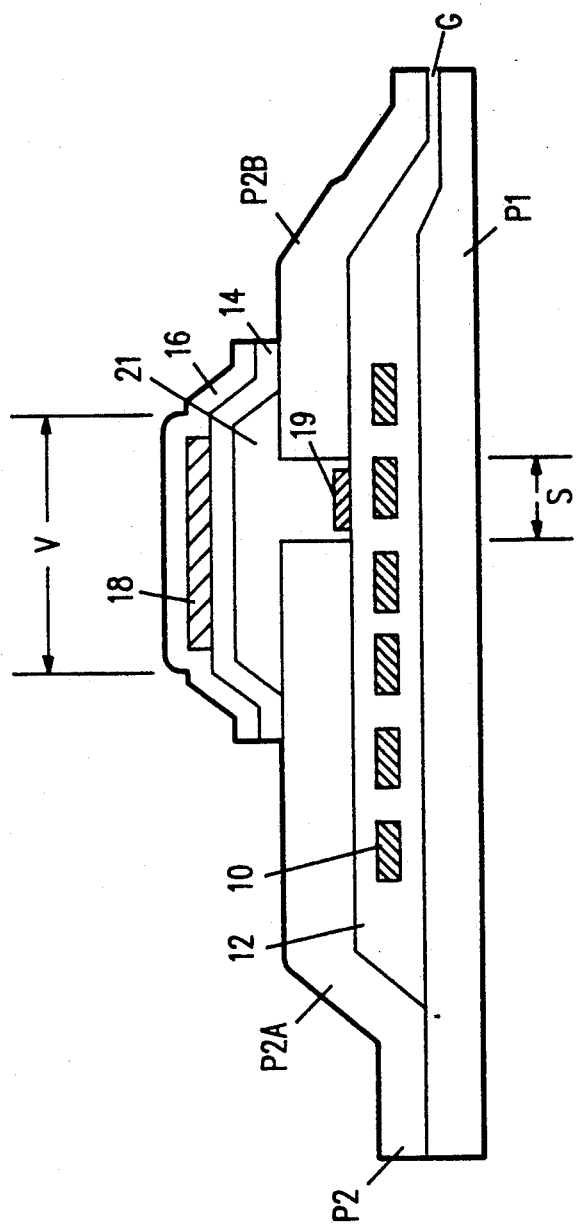
FIG. 1 is a cross-sectional view of a thin film read-write head incorporating an MR element and a valve conductor, in accordance with this invention.

In the embodiment of FIG. 1, a ring type thin film magnetic head assembly includes Permalloy magnetic layers P1 and P2 which form a magnetic yoke and define a magnetic circuit with a transducing gap G therebetween. The P1 and P2 layers are deposited over a ceramic substrate (not shown). A conductive coil or winding 10, made of copper turns, is embedded in an insulating material 12 deposited between the P1 and P2 layers.

In accordance with this invention, an MR sensor 19 having a defined easy axis of magnetization is provided along the magnetic circuit path between portions P2A and P2B of the P2 layer. The MR sensor 19, which is made from a Permalloy material having a thickness of about 200–300 Angstroms, is encompassed by an insulating material 21. The length of the MR sensor can be made much longer than the width of the recorded tracks since the lateral sensitivity is determined by the width of the pole tips and not by the length of the MR transducer. The region of sensitivity for reading coincides exactly with the region in which the write field is high enough for recording.

In keeping with this invention, a valve conductor 18 is formed between Permalloy layers 14 and 16 which are deposited above the insulating layer 21 and the P2 layer. The Permalloy layers 14 and 16 are in contact with the P2 layer thereby forming a continuous flux path for completing the write magnetic circuit. The valve conductor 18 is formed from one or more copper turns. If more than one turn is used for the valve conductor 18, insulation is provided between the turns of the valve conductor and the Permalloy layers 14 and 16. The valve conductor 18, together with the magnetic layers 14 and 16, forms a magnetic valve capable of opening and closing the magnetic shunt path provided by layers 14 and 16.

During the write mode, the valve conductor 18 is not energized and is inactive so that the signals representing data to be recorded bypass the MR element 19 and are directed through the Permalloy branches 14 and 16 that surround the valve conductor 18. The write data signals are transduced at the nonmagnetic gap G and recorded on a magnetic medium. During the read mode, a current of about 25 milliampere turns, for example, is applied to the valve conductor 18 to saturate the magnetic material of the Permalloy layers 14 and 16. The magnetic layers 14 and 16 together have substantially the same thickness as the P2 layer, which may be about 2 to 3 microns by way of example. When magnetic flux from the recorded medium enters one of the pole tips of the P1 and P2 layers, the MR element 19 senses the flux as the flux traverses the MR gap.

The read efficiency of the head is determined by the ratio of the MR sensor gap length s to valve gap length v. Read efficiency is improved by increasing v; however this also requires a higher valve current. For example, if s = 300 microinches and v = 1000 microinches then the magnetic circuit surrounding the valve conductor 18 is approximately 2500 microinches long. If a field $H_k$ 5 Oersteds is needed to saturate the magnetic material of layers 14 and 16, the magnetomotive force (mmf) that is required is 25 milliampere turns. To generate this mmf, a single turn can be used and no insulating material is then needed to surround the valve conductor 18. If a higher read efficiency is desired, the valve gap length v is increased, but a higher saturation valve current needs to be applied.

During the read mode, the MR element needs to be energized with a DC current. MR element 19 and valve conductor 18 can be dimensioned in such a way so that they are connected in series. This does not significantly affect the read efficiency, since the MR element 19 has a much higher resistance than valve conductor 18. Moreover, by making the thickness of layer 14 and the thickness of layer 16 different from each other, while keeping their sum equal to the thickness of layer P2, a DC bias field may be generated at MR element 19, making any other biasing means unnecessary.

In an alternative embodiment, the MR element and the magnetic valve are combined with the P1 layer instead of the P2 layer. This requires establishing a trench of sufficient depth and size in the substrate to accommodate the magnetic valve. Dimensioning of the MR and valve gaps would be the same as previously described for the P2 location.

In another embodiment, each of the P1 and P2 layers include an MR element and a magnetic valve. Biasing and electrical connection of the two MR elements are implemented so that their outputs are sensed by a differential amplifier, which provides common mode rejection and doubles the signal. In this way, the signal-to-noise ratio is significantly improved.

As is well known in the art, wiring and vias are used to make the necessary electrical connections, including connection to external circuitry, but are not shown for purpose of convenience and clarity of illustration of the drawing.

Figure 2:
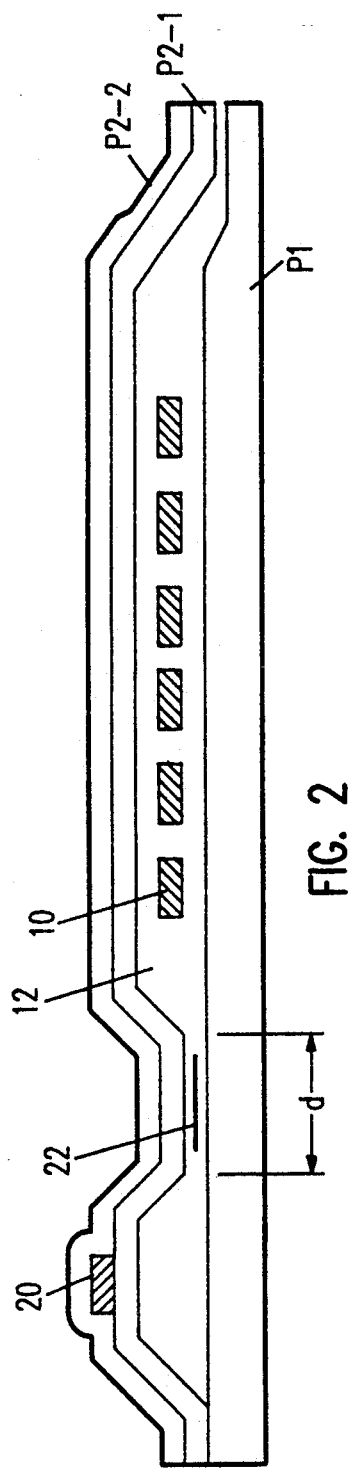
FIG. 2 is a cross-sectional view of another embodiment of the invention, depicting a thin film read-write head incorporating a Hall sensing element and a valve conductor.

With reference to FIGS. 2 and 4, a Hall effect device 22 is used as the flux sensing read element. The Hall sensor 22 typically has four electrical leads, two leads for receiving drive current to energize the device and two orthogonally disposed leads for sensing read signals. The dimension d of the Hall sensor 22 is relatively small so that the flux density at the Hall sensor is sufficiently high. The arrangement produces a back gap having a substantial reluctance. To achieve adequate write efficiency, the back gap is bypassed by the shunt provided by the P2-1 and P2-2 layers. The valve conductor 20 is deposited between the two layers P2-1 and P2-2. During reading, a saturation current is applied through an electrical connection to the valve conductor 20 to interrupt the shunt and to allow sensing of the flux signal by the Hall sensor 22.

Figure 3:
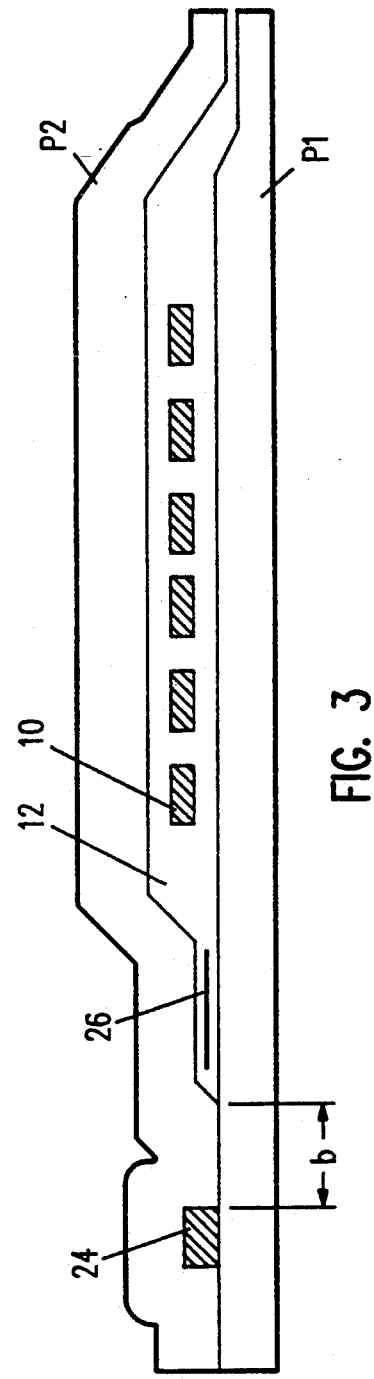
FIG. 3 is a cross-sectional view of an alternative embodiment of a thin film magnetic read-write head made in accordance with this invention, incorporating a Hall sensing element and a valve conductor.

Another version of the arrangement of FIG. 2 is illustrated in FIG. 3, wherein a valve conductor 24, about 1 to 2 microinches in thickness, is located at the back gap between the P1 and P2 layers. However, the dimension b, which is the thickness of the shunt path between the valve conductor 24 and Hall element 26, must be tightly controlled. If the dimension b is too large, the magnetic material of the valve will not be completely saturated during reading and therefore read efficiency will be decreased. On the other hand, if the dimension b is too small, stray flux from the valve 24 may saturate the Hall sensor 26.

The invention disclosed herein solves several problems that have been encountered with read-write magnetic heads using flux sensors for the read function so that the manufacturing tolerance problem is alleviated. The necessary alignment of the MR read element and the write assembly is provided by virtue of the novel configurations. Also, thermal noise spikes and Barkhausen noise are eliminated or minimized. In addition, the signal-to-noise ratio is significantly improved because differentiation is no longer required.

The device disclosed herein affords a higher spatial resolution than a conventional MR read head because the gap length can be made smaller than that of a conventional MR head. The MR transducer can be placed sufficiently far away from the pole tips to experience only negligible temperature excursions during contact with asperities of the magnetic medium surface.

It should be understood that the invention is not limited to the specific parameters, materials and dimensions described by way of example, which may be modified within the scope of the invention.

What is claimed is:
1. A thin film read-write magnetic head comprising:
   first and second magnetic layers for forming a magnetic circuit path with a transducing gap;
   flux sensing means disposed within said magnetic circuit path, said sensing means being bypassed and inactive during signal recording;

magnetic valve means coupled to said magnetic circuit path for providing a magnetic shunt to bypass said flux sensing means during signal recording, said valve means comprising a magnetic shunt coupled to at least one of said magnetic layers and electrical conductor means encompassed by said magnetic, said magnetic valve means being deactivated by passing a current through said electrical conductor means during signal reading so that the flux representing a read out signal is sensed by said flux sensing means.

2. A magnetic head as in claim 1, wherein said second layer is formed with a separation in which said flux sensing means is located.

3. A magnetic head as in claim 2, wherein said second layer is formed with two portions around said separation, and said magnetic shunt comprises third and fourth magnetic layers disposed over said separation and over said portions.

4. A magnetic head as in claim 3, wherein said valve conductor means is disposed between said third and fourth magnetic layers for activating or deactivating said magnetic shunt.

5. A magnetic head as in claim 3, wherein the total thickness of said third and fourth magnetic layers is approximately the same as the thickness of said second magnetic layer.

6. A magnetic head as in claim 1, including an electrical coil disposed between said first and second magnetic layers for conducting electrical signals during the record mode.

7. A magnetic head as in claim 1, wherein said flux sensing means is a magnetoresistive sensing element.

* * * * *